Dec. 24, 1957  H. R. WORTHINGTON, JR  2,817,835
LOBE COMPARISON SYSTEMS
Filed Nov. 29, 1945  2 Sheets-Sheet 1

INVENTOR
HARVEY R. WORTHINGTON JR.
BY *M. O. Hayes*

ATTORNEY

Dec. 24, 1957 H. R. WORTHINGTON, JR 2,817,835
LOBE COMPARISON SYSTEMS
Filed Nov. 29, 1945 2 Sheets-Sheet 2
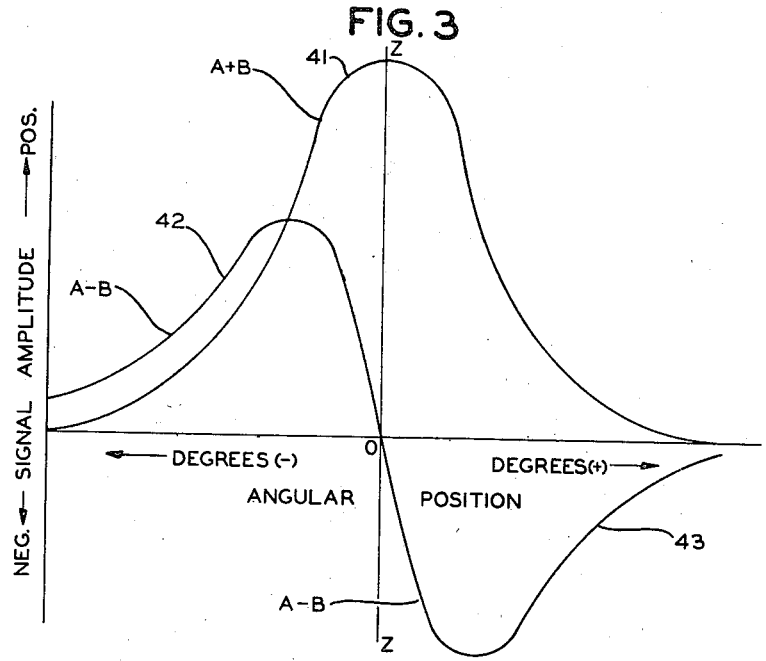
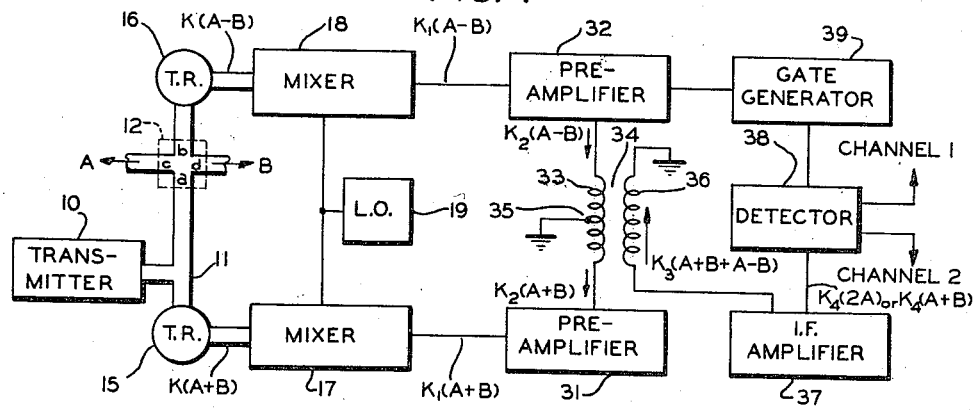
INVENTOR
HARVEY R. WORTHINGTON JR.
BY
ATTORNEY United States Patent Office 2,817,835
Patented Dec. 24, 1957

2,817,835

LOBE COMPARISON SYSTEMS

Harvey R. Worthington, Jr., Cambridge, Mass., assignor, by mesne assignments, to the United States of America as represented by the Secretary of the Navy Application November 29, 1945, Serial No. 631,742

9 Claims. (Cl. 343—16)

My present invention relates in general to directional radio systems, and in particular to such systems that yield information that aids in the maintaining of the true direction of the antenna, as for example, for keeping the antenna pointed at a desired transmitter or target.

In radio communication between two directive radio stations or in radar systems, it is often desirable to have an antenna system which is directional and which further has means for indicating when the antenna is pointed directly at the other station or at the desired target. Such systems as have been used in the past have involved mechanical lobe switching or systematic antenna scanning, such as conical scanning or other types of beam scanning. In general, these past systems are characterized by a necessity for moving mechanical parts, such as rotating antenna configurations or rotating capacitor devices and associated motors, or for maintaining equal gains in two or more amplification channels.

It is a specific object of my present invention to provide a directive radio system which will perform the function of a lobe switched or conically scanned antenna or other type of directional antenna of the character being discussed without the use of any moving parts. Accordingly, my present invention contemplates a radio system which may be either a receiver system or a radar system, as desired, having an antenna system comprising a pair of antenna elements which may be so fed that together these elements produce effectively a single directive beam for transmitting. In receiving the signals received by the aforementioned individual antenna elements are separated and then recombined in a novel fashion to produce a directional error signal at least in one plane, such as for example, a vertical or horizontal plane. This signal is then further operated upon to produce direct current directional error impulses which may be used to actuate visual directional error devices or automatic directional error corrective devices.

It is a further object of my invention to provide a directive simultaneous lobe comparison antenna system which will provide a directional error signal without the use of any moving parts.

It is a still further object of my invention to provide a directive simultaneous lobe comparison antenna system for a radar system which may be used for both transmitting and receiving and will provide at least an azimuth or an elevation error signal without the use of any moving part.

It is also an object of my invention to provide a directive lobe comparison antenna system which will provide a directional error signal without the use of any moving parts.

It is another object of my invention to provide a directive lobe comparison antenna system which will provide a directional error signal without the need for maintaining equality in the gains of two or more amplification channels.

These and other objects of my invention may be more fully understood from a careful consideration of the following detailed description when taken together with the accompanying drawings, the figures of which illustrate typical embodiments of the invention.

In the drawings:

Fig. 3 is a graph showing the amplitudes with respect to the angle of the direction of reception of certain signals produced during reception in the system of my invention illustrated in Fig. 2; and Fig. 4 illustrates a second embodiment of my invention in electrical schematic form, also as practiced in a radar system.

Figure 1:
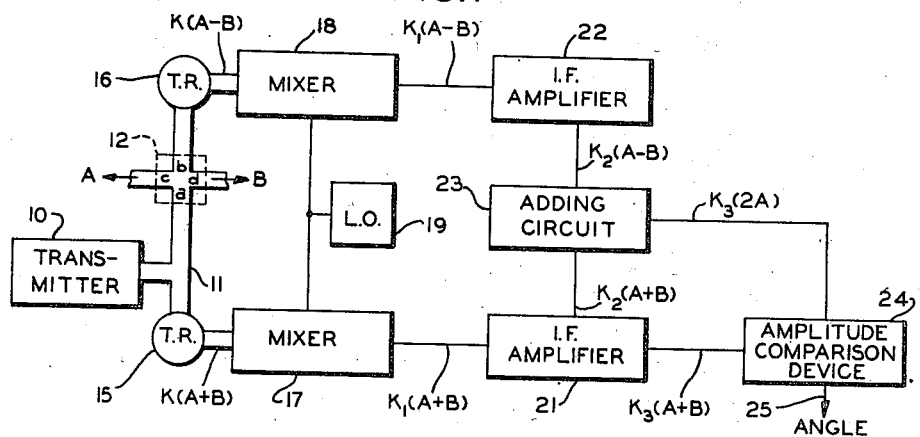
Fig. 1 illustrates an embodiment of my invention in electrical schematic form as practiced in a radar system.

Although my invention may be illustrated more simply in a radio receiving system, the apparatus of Figs. 1 and 4 shows the invention in a radar system inasmuch as the function of receiving is included in such systems. Accordingly, a radio transmitter 10 is provided, connected to a transmission line 11. The energy generated by the transmitter 10 is led through the transmission line 11 to a junction of four transmission lines $a$, $b$, $c$ and $d$, known as a "duplex balancer," illustrated schematically in a block 12. For a better understanding of the invention, the "duplex balancer" will now be explained in greater detail.

The "duplex balancer" is disclosed and so-named in the copending application of Warren A. Tyrrell for "Coupling Arrangement for Use in Wave Transmission System," Serial No. 470,810, filed December 31, 1942, and assigned to Bell Telephone Laboratories, Inc., now Patent Number 2,445,895. The "duplex balancer" is a system comprising a common junction of a plurality of transmission lines, as for example, four transmission lines $a$, $b$, $c$ and $d$ with each other or with a fifth line. If the system is matched to eliminate resonance in the various lines for the energy being carried therein, the electrical structure and symmetry of the system may be so arranged that the following characteristics are had among others:

(1) Power fed into line "$a$" passes into lines "$c$" and "$d$" in equal quantities, emerging from "$c$" and "$d$" in the same phase, no power passing into line "$b$."

(2) Power fed simultaneously and in phase into lines "$c$" and "$d$" enters line "$a$" in additive fashion and line "$b$" in subtractive fashion.

The electrical structure should be such that the lines $a$, $c$ and $d$ are joined in parallel and the line $b$ in series to the others to provide these characteristics. Such a matched arrangement is more specifically termed a "Magic Tee," and is described in greater detail in the copending application of Robert H. Dicke for "Transmission System," Serial No. 581,695, filed March 8, 1945, now Patent Number 2,593,120, assigned to the United States Government, wherein certain matching means for a Magic Tee constructed of wave guides are disclosed. The above enumerated characteristics are employed in my present invention as will hereinafter be more fully explained.

Figure 2A:
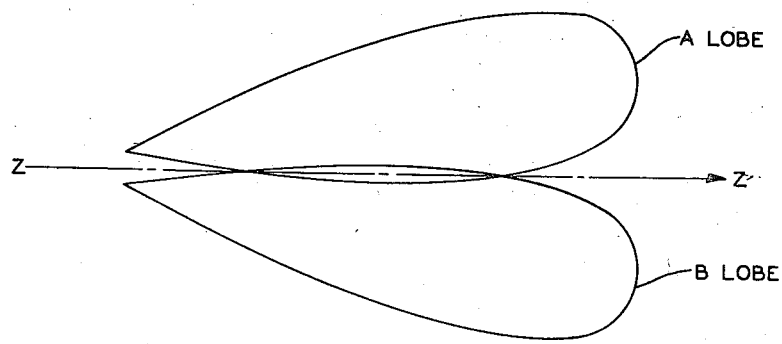
Fig. 2A illustrates the beam pattern of an antenna fed by the apparatus of Fig. 2.
Figure 2:
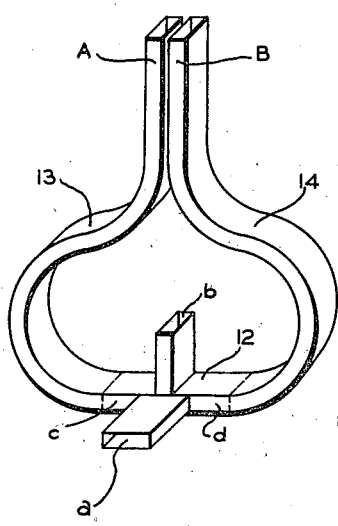
Fig. 2 illustrates an antenna feed system in accordance with my invention.

Although a duplex balancer may be made of any desired type of transmission line or of circuit elements as discussed and shown in the aforementioned copending application of Tyrrell, only that form constructed entirely of wave guides, as for example that illustrated in Fig. 2, will be considered herein, inasmuch as the embodiments of my invention herein described illustrate the invention as it may be practiced using wave guides for transmission lines. Accordingly, in Fig. 2, energy entering the first line $a$ of the Magic Tee 12 will, in accordance with the above discussion, divide and pass into a third and fourth line $c$ and $d$ of this Magic Tee in equal quantities and like phase. No energy will enter the second line $b$. In order that energy may leave the third and fourth arm $c$ and $d$ of the Magic Tee in like phase, it is desirable that these arms be of equal length with respect to each other. Transmission lines 13 and 14 preferably of equal length are connected between the third and fourth lines $c$ and $d$ of the Magic Tee 12 and antenna feed elements A and B, thus providing equal phase feeds for these antenna elements. Each of the antenna feed elements A and B provides a lobe pattern, the A lobe and the B lobe respectively as shown in Fig. 2A, and the elements are so arranged coadjacently that the two lobes are nearly similarly directed and partially overlap in space, so that the antenna system may be thought of as a single directive antenna having an axis Z—Z located substantially equidistantly between the lobes. However, it is convenient to consider the A lobe and the B lobe separately for the purposes of this explanation and the hereinafter following analysis of operation.

During transmission an effectively single lobe is transmitted inasmuch as the A and B lobes will add in phase to provide in effect a single lobe. Upon reception, however, each lobe will return energy to its own antenna feeds, A or B. This energy in turn returns to the Magic Tee 12 through the third and fourth arms $c$ and $d$ thereof. In accordance with the second characteristic of a Magic Tee as hereinabove set forth, the energy in the feeds A and B enters the first line $a$ of the Magic Tee 12 in additive fashion $(A+B)$, and the second line $b$ of the Magic Tee 12 in subtractive fashion $(A-B)$. As shown in Figs. 1 and 4, the received energy emerging from the first line $a$ of the Magic Tee 12 passes through a first receiver protective device 15, which may be a conventional TR box, and provides a first signal $k(A+B)$ which is proportional in magnitude to and has the sense of the algebraic sum of the magnitude or amplitudes of the signals in the antenna feeds A and B. Likewise, the received energy leaving the second arm $b$ of the Magic Tee 12 passes through a second TR box 16 and provides a second signal $k(A-B)$ which is proportional in magnitude to and has the sense of the difference between the amplitudes of the signals in the antenna feeds A and B. The first signal $k(A+B)$ is provided to a first mixer 17 while the second signal $k(A-B)$ is provided to a second mixer 18. A local oscillator 21 is provided for both mixers 17 and 18 together, and is arranged in convention superheterodyne fashion to beat with the first and second signals $k(A+B)$ and $k(A-B)$ simultaneously. Intermediate frequency (I. F.) signals $k_1(A+B)$ and $k_1(A-B)$ are accordingly produced in the mixers 17 and 18, respectively. These I. F. signals remain dependent in magnitude and sense upon their parent signals $k(A+B)$ and $k(A-B)$.

Thus far my invention comprises a system for producing two artificial signals proportional in their amplitudes respectively to the sum of and the difference between the amplitudes of the signals in two antenna feeds A and B, and having the sense of that sum or difference respectively. Various systems for recombining these two artificial signals to provide directional error information may be used. In Figs. 1 and 4 there are proposed two distinct and different systems for such use. Accordingly, in Fig. 1 the I. F. signals $k_1(A+B)$ and $k_1(A-B)$ produced in the mixers 17 and 18 respectively are fed to first and second I. F. amplifiers 21 and 22 respectively which amplify the I. F. signals to provide stronger first and second signals $k_2(A+B)$ and $k_2(A-B)$ respectively. These signals remain proportional in their magnitudes to the algebraic sum and difference respectively of the amplitudes of the signals present in the antenna feeds A and B and continue to have their respective senses determined by that algebraic sum or difference. The signals $k_2(A+B)$ and $k_2(A-B)$ are fed to and energize an adding circuit 23 which algebraically adds the amplitudes of these two signals and provides an output signal $k_3(A+B+A-B)$ proportional to their algebraic sum. This signal may be considered simply as $k_3(2A)$. The first I. F. amplifier 21 provides also a second output signal $k_3(A+B)$ which is preferably equal in magnitude to the amplitude of the first signal $k_2(A+B)$ provided by that I. F. amplifier. The system is preferably adjusted so that the amplitudes of the output $k_3(2A)$ of the adding circuit 23 and of the second output signal $k_3(A+B)$ of the first I. F. amplifier 21, are equal when the antenna system is receiving energy directly along the main axis Z—Z. The output $k_3(2A)$ of the adding circuit 23 and the second output $k_3(A+B)$ of the first I. F. amplifier 21 are fed to an amplitude comparison device 24, which preferably is of the type that compares the amplitudes of two input signals and provides an output signal 25 which is proportional in magnitude to the difference between the amplitudes of these two input signals and has the sense of that difference. Such amplitude comparison devices are well known to those skilled in the art. Such an output signal 25 indicates the angular error in training of the antenna combination A and B. This output signal 25 may further be rectified in conventional fashion to provide a D. C. voltage for operating motors or other automatic error correction devices or for operating an optical error indicating device such as a cathode ray tube.

In Fig. 4 there is illustrated a second system for recombining the two artificial signals $k(A+B)$ and $k(A-B)$ so as to yield information that will indicate the error in angular position of the antenna system A and B. Accordingly, the I. F. signals $k_1(A+B)$ and $k_1(A-B)$ are fed to first and second pre-amplifiers 31 and 32 respectively, which are amplifiers having small or unit gain as desired, since at this stage gain is not desired. These preamplifiers 31 and 32 provide first and second signals $k_2(A+B)$ and $k_2(A-B)$ respectively to the primary 33 of a voltage adding system constructed in the fashion of a transformer 34. The primary 33 is grounded at its center 35 and the two signals $k_2(A+B)$ and $k_2(A-B)$ are so provided to this primary that their amplitudes are added algebraically therein. Accordingly in the secondary 36, a signal $k_3(A+B+A-B)$ or $k_3(2A)$ appears which is proportional in amplitude to the algebraic sum of the amplitudes of the two input signals $k_2(A+B)$ and $k_2(A-B)$. This last signal $k_3(A+B+A-B)$ is amplified in a single I. F. amplifier 37 and the resulting output signal $k_4(2A)$ is fed to a detector 38.

The detector 38 has two output channels, channel 1 and channel 2. Channel 1 is a normal output channel and the signal $k_4(A+B+A-B)$ is detected and normally fed out as a detected signal therethrough, providing a first D. C. output signal. Channel 2 is used when a rectangular voltage pulse hereinafter to be described is applied to the detector by a gate generator 39. When the gate generator 39 applies such a rectangular voltage pulse to the detector 38, channel 2 is used as the output channel in place of channel 1.

The gate generator 39 is adapted to generate rectangular voltage pulses at a predetermined repetitive rate and to provide these pulses simultaneously to the second preamplifier 32 so as to render that pre-amplifier inoperative and to the detector 38 so as to provide output channel 2 operation. When the second pre-amplifier 32 is rendered inoperative by the gate generator 39, the output signal of that pre-amplifier $k_2(A-B)$ ceases to exist. Consequently, the only signal present in the primary 33 of the transformer 34 is the signal $k_2(A+B)$ from the first pre-amplifier 31. As a further consequence the signal present in the secondary 36 is $k_3(A+B)$, proportional only to the signal $k_2(A+B)$. Likewise, the output of the I. F. amplifier 37 will then be $k_4(A+B)$. Accordingly the signal present in the second channel, channel 2, of the detector 38, is a D. C. signal proportional in amplitude to the amplitude of the signal $k_4(A+B)$ when that channel is used. Thus when the gate generator 39 is not providing a rectangular voltage pulse, output channel 1 will provide a D. C. signal proportional to $(A+B+A-B)$ or (2A), while when the gate generator 39 is operating, output channel 2 will provide a D. C. signal proportional to (A+B). These signals will be provided alternately and not simultaneously as in the apparatus of Fig. 1. The two output signals of channels 1 and 2 may be fed again to a visual error indicating device or an automatic error correction device to determine the amount of angular error in the antenna directivity and provide correction signals as desired. It will be necessary also to furnish information from the gate generator 39 to the corrective device, in order that the sense of the directional error may be determined.

Reference to the graph of Fig. 3 will aid in explaining in greater detail how the Magic Tee 12 provides the two signals $k(A+B)$ and $k(A-B)$, proportional in amplitude respectively to the magnitude of the sum of and difference between the amplitudes of the signals in the antenna feeds A and B. This is modeled upon an experimental graph and illustrates that the amplitude of the signal $k(A+B)$ out of the first line $a$ of the Magic Tee 12 is proportional in amplitude to the sum of the amplitudes of the signals in each of the primary antenna feeds A and B. The first curve 41 illustrates the amplitude of the signal $k(A+B)$ that will be present in the first line $a$ of the Magic Tee 12 when that signal is received in various directions ahead of the antennas A and B. According to the curve 41 for the output from the first line $a$, the amplitude of the signal in this first line $a$ is at a maximum when received from a direction dead ahead, and falls uniformly to a minimum at the extremes as the number of degrees from the axis is increased. The $A-B$ condition, which is the output from the second line $b$ of the Magic Tee 12, is illustrated by the second two-humped curve 42, 43. This curve shows that the amplitude of the signal $k(A-B)$ from the second line $b$ falls sharply to zero or a null in the direction dead ahead where the feeds A and B receive signals of equal amplitude, and therefore, where the amplitude of the signal $k(A-B)$ should be expected to become zero. These curves 42 and 43 rise to humps or peaks at directions somewhat off the axis Z—Z and then further fall to zero again. The negative signal curve 43 illustrates the voltage condition of $A-B$ for a direction on one side of the axis. It is to be expected that $k(A-B)$ should be positive on one side of the axis Z—Z where the amplitude of the signal in the A lobe is greater than the amplitude of the signal in the B lobe, and negative on the opposite side of the axis Z—Z where the amplitude of the signal in the A lobe is less than the amplitude of the signal in the B lobe. Since, on the axis Z—Z the amplitude of the signals in the A lobe and in the B lobe are the same, $A+B$ is actually equal to 2A. Thus in Figs. 1 and 4 when the antenna comprising elements A and B together is receiving power from directly ahead along the axis Z—Z, the signal $k(A+B)$ is equal to $k(2A)$. Therefore, in the apparatus of Fig. 4 the signal $k_2(A+B)$ in the primary 33 of the transformer 34 is equal to $k_2(2A)$ when the signal $k_2(A-B)$ is equal to zero, so that the signal in channel 2 is then proportional to 2A. Since the signal in channel 1 is always proportional to 2A, a condition of no-difference or zero error between the signals in channels 1 and 2 is had when the antenna comprising the feeds A and B is receiving power from directly ahead, along the axis Z—Z. Likewise in the apparatus of Fig. 1 $k_3(A+B)$ is equal to $k_3(2A)$ in the ahead direction, along the axis Z—Z, and the output from the adding circuit 23 is therefore adjusted so that a zero output 25 will be had when there is a zero angular error.

In either system illustrated in Figs. 1 and 4, in the case where a target being tracked lies in the lobe produced by the primary feed A more than it lies in the lobe produced by the primary feed B, the amplitude of the $A+B$ signal will be less than that of the 2A signal and an error signal of a certain magnitude and sense will be supplied by the system. If the target lies more in the lobe of primary feed B than in that of the primary feed A, the amplitude of the $A+B$ signal will be greater than that of the 2A signal and an error signal again of a certain magnitude and the opposite sense from that obtained with the previously described condition will result. When the target lies equally in both the lobes A and B, the $A+B$ signal will equal the 2A signal and the angular error voltage will be zero. In the apparatus of Fig. 1 unequal gains in the two channels effect neither this point of balance nor the sign of the error signal. In the apparatus of Fig. 4, since there is only one I. F. amplifier 37 and since the pre-amplifiers 31 and 32 have very small gain unequal gain will have a negligible effect. Caution in the design of the separate channel amplifiers 21 and 22 of the apparatus of Fig. 1 is suggested to avoid unequal phase shifts in the signals $k_2(A+B)$ and $k_2(A-B)$ therein. Likewise unequal TR losses and unequal conversion losses in the mixers do not disturb the balance of the system.

Although my invention has been described in terms of microwave components, it should be possible to build similar systems at lower frequencies using their low frequency counterparts, as for example, other types of duplex balancers of Magic Tees and other types of transmission lines. It should be noted that my invention provides a comparison at a high frequency level before amplification takes place of signals returning from the two off-axis lobes A and B and hence provides an error signal which is independent within broad limits of overall gain in the two branches of the system.

Although I have shown and described my invention as a system for lobe comparison in one plane only, as for example, the X plane, it should be appreciated that the system may be used for comparison of lobes in two planes, such as the X and Y planes, which may be mutually perpendicular. With such a biplanar system, the following gating sequence is suggested: $2A_x$, $2A_y$; $A_x+B_x$, $A_y+B_y$; where $A_x$ and $A_y$ are the energy received in an A antenna in two different planes X and Y and $A_x+B_x$ and $A_y+B_y$ are the summation signals from energy received in the X plane and Y plane respectively. Various other changes may be made in the embodiments of my invention illustrated and different embodiments of the invention may be made without departing from the scope thereof, and it is, therefore, intended that all matter contained in the hereinabove description or shown in the accompanying drawing shall be interpreted as illustrative and not in a limiting sense.

I claim:

1. Electric wave controlling apparatus comprising, first and second directive antenna elements arranged to produce respectively first and second adjacent lobes, means operative during transmission for feeding said elements with equal quantities of like phased energy of a predetermined frequency, means operative during reception for producing a first voltage proportional in magnitude to the magnitude of and having the sense of the algebraic sum of the amplitudes of the respective signals received by said elements, and means simultaneously operative during said reception for producing a second voltage proportional in magnitude to the magnitude of and having the sense of the algebraic difference between said amplitudes of said respective signals.

2. A radio receiver comprising, first and second directive antenna elements arranged adjacently in a plane to function as a single directive antenna having directivity at least in said plane along an axis lying therein, said elements being adapted during reception to receive first and second signals respectively, said signals having equal magnitudes when said energy is received only along said axis and unequal magnitudes when said energy is received obliquely to said axis in said plane, means for producing third and fourth signals proportional in their magnitudes respectively to the algebraic sum and difference of the magnitudes of said first and second signals and having the sense of said sum or difference, means for producing a fifth signal proportional in magnitude to and having the sense of the algebraic sum of the magnitudes of said third and fourth signals, and means for producing a sixth signal proportional in magnitude to and having the sense of the difference between the magnitudes of said third and fifth signals.

3. A radio receiver comprising, first and second directive antenna elements providing first and second lobes respectively arranged adjacently in a plane to function as a single directive antenna having directivity at least in said plane along an axis lying therein, said elements being adapted during reception to receive first and second signals respectively, said signals having equal amplitudes when energy is received solely along said axis and unequal amplitudes when said energy is received obliquely to said axis in said plane, means for producing third and fourth signals proportional in amplitude respectively to the algebraic sum of and difference between said amplitudes of said first and second signals and having the sense of said sum or difference, means for amplifying said third and fourth signals, and means for recombining said third and fourth signals to provide fifth and sixth signals having a difference in their amplitudes corresponding in magnitude to the magnitude of the difference between said amplitudes of said first and second signals and having the sense of said last mentioned difference, said differences in magnitude becoming zero simultaneously.

4. A radar system comprising, a transmitter, first and second directive antenna elements having first and second lobes respectively arranged adjacently in a plane to function as a single directive antenna having directivity at least in said plane along an axis lying therein, means for feeding said elements with equal like-phased quantities of energy from said transmitter, said elements being adapted during reception to divide the total energy received into first and second signals in said first and second lobes respectively, said signals having equal magnitudes when said energy is received only along said axis and unequal magnitudes when said energy is received obliquely to said axis in said plane, means for producing third and fourth signals proportional in their magnitudes respectively to the algebraic sum and difference of the magnitudes of said first and second signals and having the sense of said sum or difference, means for producing a fifth signal proportional in magnitude to and having the sense of the algebraic sum of the magnitudes of said third and fourth signals, and means for producing a sixth signal proportional in magnitude to and having the sense of the difference between the magnitudes of said third and fifth signals.

5. A radar system comprising, a transmitter, first and second directive antenna elements having first and second lobes respectively arranged adjacently in a plane to function as a single directive antenna having directivity at least in said plane along an axis lying therein, a four line duplex balancer comprising a common, junction of first, second, third and fourth transmission lines, said first line being energized by said transmitter, said third and fourth lines being connected one to each of said antenna elements, the energy from said transmitter dividing into two parts in said duplex balancer and entering said third and fourth lines in like-phased equal quantities, none of said energy entering said second line, said elements being fed in the same phase with said energy during transmission, said elements being adapted during reception to divide the energy received into first and second signals in said first and second lobes respectively, said signals having equal magnitudes when said energy is received only along said axis and unequal magnitudes when said energy is received obliquely to said axis in said plane, said signals combining in said duplex balancer and entering said first line thereof in additive fashion to pro- vide a third signal proportional in magnitude to and having the sense of the algebraic sum of their magnitudes and entering said second line thereof in subtractive fashion to provide a fourth signal proportional in magnitude to and having the sense of the algebraic difference between their magnitudes, a voltage adding circuit energized by a first fraction of said third and all of said fourth signals additively and providing a fifth signal, means for combining the amplitudes of said fifth and the remaining fraction of said third signals and providing a directional error signal proportional in magnitude to the difference in said amplitudes and having the sense of said difference, said first fraction of said third signal being adjusted in magnitude so that said fifth signal and said remaining fraction of said third signal are of equal magnitudes when said energy is received solely along said axis.

6. A radar system comprising, a transmitter, first and second directive antenna elements having first and second lobes respectively arranged adjacently in a plane to function as a single directive antenna having directivity at least in said plane along an axis lying therein, a four line duplex balancer comprising a common junction of first, second, third and fourth transmission lines, said first line being energized by said transmitter, said third and fourth lines being connected one to each of said antenna elements, the energy from said transmitter dividing into two parts in said duplex balancer and entering said third and fourth lines in like-phased equal quantities, none of said energy entering said second line, said elements being fed in the same phase with said energy during transmission, said elements being adapted during reception to divide the energy received into first and second signals in said first and second lobes respectively, said signals having equal magnitudes when said energy is received only along said axis and unequal magnitudes when said energy is received obliquely to said axis in said plane, said signals combining in said duplex balancer and entering said first line thereof in additive fashion to provide a third signal proportional in magnitude to and having the sense of the algebraic sum of their magnitudes and entering second line thereof in subtractive fashion to provide a fourth signal proportional in magnitude to and having the sense of the algebraic difference between their magnitudes, a voltage adding circuit energized by said third and fourth directional signals additively and providing a fifth signal, a detector for said fifth signal, said detector having a first normal output channel and a second output channel which is rendered operative in place of said first channel upon the applications to said detector of a gate voltage pulse, means for simultaneously switching said detector into second channel output operation and switching off said fourth signal, said switching means being operated repetitively at a predetermined rate to provide first and second output signals alternately in said first and second channels respectively, said first output signal being proportional in magnitude to the algebraic sum of the magnitudes of said third and fourth signals and said second output signal being proportional in magnitude to the magnitude of said third signal alone.

7. In an automatic target tracking radar system, apparatus for producing a directional error signal comprising, a pair of directional antenna elements, each producing a lobe beam pattern, arranged coadjacently to direct the lobes similarly and partially overlapping, means during reception to combine the signals from said antenna elements to derive a summation signal and a differential signal, and means for combining the algebraic sum of said summation signal and said differential signal with said summation signal to derive an output signal.

8. In an automatic target tracking radar system, apparatus for producing a directional error signal comprising, a pair of directional antenna elements, each producing a lobe beam pattern, arranged coadjacently to direct the lobes similarly and partially overlapping, means during reception to combine the signals from said antenna elements to derive a summation signal and a differential signal, means operative to obtain the algebraic sum of said summation signal and said differential signal, and means for combining said algebraic sum with said summation signal to obtain an output signal when the signals received by said antenna elements are unequal.

9. In an automatic target tracking radar system, apparatus for producing a directional error signal comprising, an antenna system having a pair of directional antenna elements each producing a lobe beam pattern and arranged coadjacently to direct the lobes similarly and partially overlapping, a source of radio frequency energy of predetermined frequency, means operative during transmission for feeding said elements with equal quantities of like phased energy from said source to produce a single directive beam and operative during reception to combine the separate signals received by each of said antenna elements to derive a summation signal and a differential signal, means for obtaining the algebraic sum of said summation signal and said differential signal, and means for combining said algebraic sum of said summation signal and said differential signal with said summation signal to derive an output signal when the signals received by said antenna elements are unequal.

References Cited in the file of this patent

UNITED STATES PATENTS

| | | |
|---|---|---|
| 1,787,992 | McIlvaine | Jan. 6, 1931 |
| 1,968,068 | Blancard | July 31, 1934 |
| 2,061,737 | Offenhauser | Nov. 24, 1936 |
| 2,283,677 | Kandoian | May 19, 1942 |
| 2,283,897 | Alford | May 26, 1942 |
| 2,320,521 | Kear | June 1, 1943 |
| 2,445,895 | Tyrrell | July 27, 1948 |
| 2,480,829 | Barrow et al. | Sept. 6, 1949 |